(12) United States Patent
Eck et al.

(10) Patent No.: US 7,980,227 B2
(45) Date of Patent: Jul. 19, 2011

(54) FEED UNIT FOR FEEDING FUEL

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 82 days.

(21) Appl. No.: 12/373,291

(22) PCT Filed: Jul. 10, 2007

(86) PCT No.: PCT/EP2007/057055
§ 371 (c)(1),
(2), (4) Date: Feb. 6, 2009

(87) PCT Pub. No.: WO2008/006833
PCT Pub. Date: Jan. 17, 2008

(65) Prior Publication Data
US 2009/0308356 A1   Dec. 17, 2009

(30) Foreign Application Priority Data
Jul. 11, 2006 (DE) .......................... 10 2006 032 099

(51) Int. Cl.
*F02M 37/08* (2006.01)
*F02M 37/04* (2006.01)
(52) U.S. Cl. ...................................................... 123/509
(58) Field of Classification Search .................. 123/509, 123/514, 497, 446, 495; 417/360; 137/565.01, 137/565.13; 210/416.4
See application file for complete search history.

(56) References Cited

U.S. PATENT DOCUMENTS

| | | | |
|---|---|---|---|
| 4,974,570 A | 12/1990 | Swargulski et al. | |
| 5,392,750 A | 2/1995 | Laue et al. | |
| 5,415,146 A | 5/1995 | Tuckey | |
| 5,556,543 A * | 9/1996 | Trabold | 210/435 |
| 5,566,543 A | 10/1996 | Taylor et al. | |
| 5,647,329 A | 7/1997 | Bucci et al. | |
| 5,900,140 A | 5/1999 | Nagai et al. | |
| 6,267,103 B1 | 7/2001 | Ludwig et al. | |
| 6,283,731 B1 | 9/2001 | Yoshioka | |
| 6,453,883 B2 | 9/2002 | Schreckenberger | |
| 6,551,509 B2 | 4/2003 | Appleton | |
| 6,893,560 B2 * | 5/2005 | Reinhart | 210/232 |
| 7,198,035 B2 | 4/2007 | Kadler et al. | |
| 7,350,509 B2 | 4/2008 | Barz et al. | |
| 2003/0188786 A1 | 10/2003 | Toki et al. | |
| 2005/0133428 A1* | 6/2005 | Peet et al. | 210/232 |

(Continued)

FOREIGN PATENT DOCUMENTS
DE    42 42 242    6/1994
(Continued)

*Primary Examiner* — Mahmoud Gimie
(74) *Attorney, Agent, or Firm* — Cohen Pontani Lieberman & Pavane LLP

(57) ABSTRACT

A feed unit for feeding fuel has a housing formed integrally with the casing of a swirl pot, the housing comprising a fine filter. The fine filter is configured open toward one side and is closed by a cover. The cover is formed integrally with a base plate sealing the casing of the swirl pot. As a result, the feed unit has a particularly low number of components to be assembled and can be produced in a particularly cost-effective way.

12 Claims, 3 Drawing Sheets

U.S. PATENT DOCUMENTS

| | | | |
|---|---|---|---|
| 2006/0070941 A1* | 4/2006 | Cline et al. | 210/416.4 |
| 2007/0084784 A1 | 4/2007 | Wehrun | |
| 2008/0127948 A1 | 6/2008 | Braun et al. | |

FOREIGN PATENT DOCUMENTS

| | | |
|---|---|---|
| DE | 4242242 A1 | 6/1994 |
| DE | 19619992 A1 | 11/1997 |
| DE | 197 44 361 | 3/1999 |
| DE | 19834653 | 12/1999 |
| DE | 198 37 954 | 1/2000 |
| DE | 19837954 C1 | 1/2000 |
| DE | 29922473 U1 | 5/2001 |
| DE | 100 04357 | 8/2001 |
| DE | 19727470 C2 | 1/2002 |
| DE | 102004021919 A1 | 12/2005 |
| DE | 10 2004 034842 | 3/2006 |
| WO | WO 0157387 | 8/2001 |
| WO | WO 2005/051699 | 6/2005 |
| WO | WO2005/051699 A1 | 6/2005 |
| WO | WO 2005085623 | 9/2005 |

* cited by examiner

FEED UNIT FOR FEEDING FUEL

PRIORITY CLAIM

This is a U.S. national stage of application No. PCT/EP2007/057055, filed on 10 Jul. 2007, priority is claimed on Application No. 10 2006 032 099.9, filed 11 Jul. 2006, the contents both of which are incorporated here by reference.

BACKGROUND OF THE INVENTION

1. Field of the Invention

The invention relates to a feed unit for feeding fuel out of a fuel tank of a motor vehicle, with a swirl pot for collecting the fuel, with a fuel pump sucking up fuel from the swirl pot, and with a fine filter which is arranged behind the fuel pump, as seen in the direction of flow, and is intended for filtering the fuel.

2. Description of the Prior Art

Feed units of this type are frequently used in motor vehicles nowadays and are known from practice. As a rule, the feed unit has a preliminary filter for filtering fuel flowing into the swirl pot. The fuel pump sucks up the fuel filtered by the preliminary filter and feeds said fuel via the fine filter to an internal combustion engine of the motor vehicle. The fine filter is therefore exposed to the pressure produced by the fuel pump. The housing of the fine filter therefore has to be of pressure-resistant configuration. In practice, the housing of the fine filter is designed as a component which is fastened separately to or in the fuel tank. The housing of the fine filter is generally fastened to adjacent components of the feed unit by welding or clipping.

SUMMARY OF THE INVENTION

A disadvantage of the known feed unit is that the fastening of the fine filter results in high manufacturing costs of the feed unit. Furthermore, the fine filter of the known feed unit is a bulky component which also requires a very large amount of construction space.

An embodiment of the invention is based on the problem of developing a feed unit of the type mentioned at the beginning in such a manner that it can be manufactured particularly cost-effectively and is constructed as compactly as possible.

This problem is solved according to one embodiment of the invention in that the housing of the fine filter is manufactured integrally with a casing of the swirl pot.

By means of this configuration, the feed unit according to the invention has a particularly low number of components, since the housing of the fine filter and the casing of the swirl pot are jointly manufactured and fitted. A complicated, separate manufacturing of the housing of the fine filter and the subsequent, complicated installation thereof are therefore avoided. This enables the feed unit according to one embodiment of the invention to be manufactured particularly cost-effectively. Furthermore, the feed unit according to one embodiment of the invention turns out to be particularly compact because of the arrangement of the housing of the fine filter on the wall of the swirl pot. In this case, the wall of the swirl pot contributes to the stability of the housing of the fine filter.

According to an embodiment of the invention, the installation of a filter cartridge in the fine filter turns out to be particularly simple if the housing of the fine filter is sealed from one side by a cover.

The number of components of the feed unit according to one embodiment of the invention is further reduced if the housing of the fine filter is open downward, and if the cover is manufactured integrally with a base plate of the swirl pot.

In contrast to the swirl pot, the housing of the fine filter has to have a high degree of stability, since it has to withstand the pressure produced by the fuel pump. According to an embodiment of the invention, the housing of the fine filter has a high degree of stability if the housing of the fine filter is curved at its end which faces away from the cover.

The stability of the housing of the fine filter is further increased if the outside of the housing of the fine filter has reinforcing webs. This configuration enables the housing of the fine filter and the casing of the swirl pot to be manufactured with approximately the same wall thickness, which results in particularly simple manufacturing from plastic by injection molding, since the housing of the fine filter and the casing of the swirl pot thereby require substantially the same cooling time.

The manufacturing of the feed unit according to one embodiment of the invention is further simplified if the reinforcing webs have the same wall thickness as the housing of the fine filter. By this means, the reinforcing webs require the same cooling time as the housing of the fine filter.

The manufacturing of the feed unit according to one embodiment of the invention is further simplified if the reinforcing webs of the housing of the fine filter are arranged parallel to the wall of the swirl pot. By means of this configuration, the unit comprising the housing of the fine filter and of the swirl pot can be manufactured in an injection mold from which the product can be removed axially.

The number of components of the feed unit according to the invention is reduced if a telescopic guide for supporting the swirl pot in the fuel tank is arranged on the housing of the fine filter. By means of this configuration, the telescopic guide results in the housing of the fine filter being reinforced. This enables the number of reinforcing webs provided for reinforcing the housing of the fine filter to be kept particularly low. Further structural elements of the feed unit, such as pump holder and the like, are likewise preferably arranged on the housing of the fine filter in order to increase the rigidity.

The dimensions of the feed unit according to the invention are reduced if the housing of the fine filter is arranged within the swirl pot.

BRIEF DESCRIPTION OF THE DRAWINGS

The invention permits numerous embodiments. To further clarify its basic principle, one of said embodiments is illustrated in the drawing and is described below. In the drawing

DETAILED DESCRIPTION OF THE PREFERRED EMBODIMENTS

Figure 1:
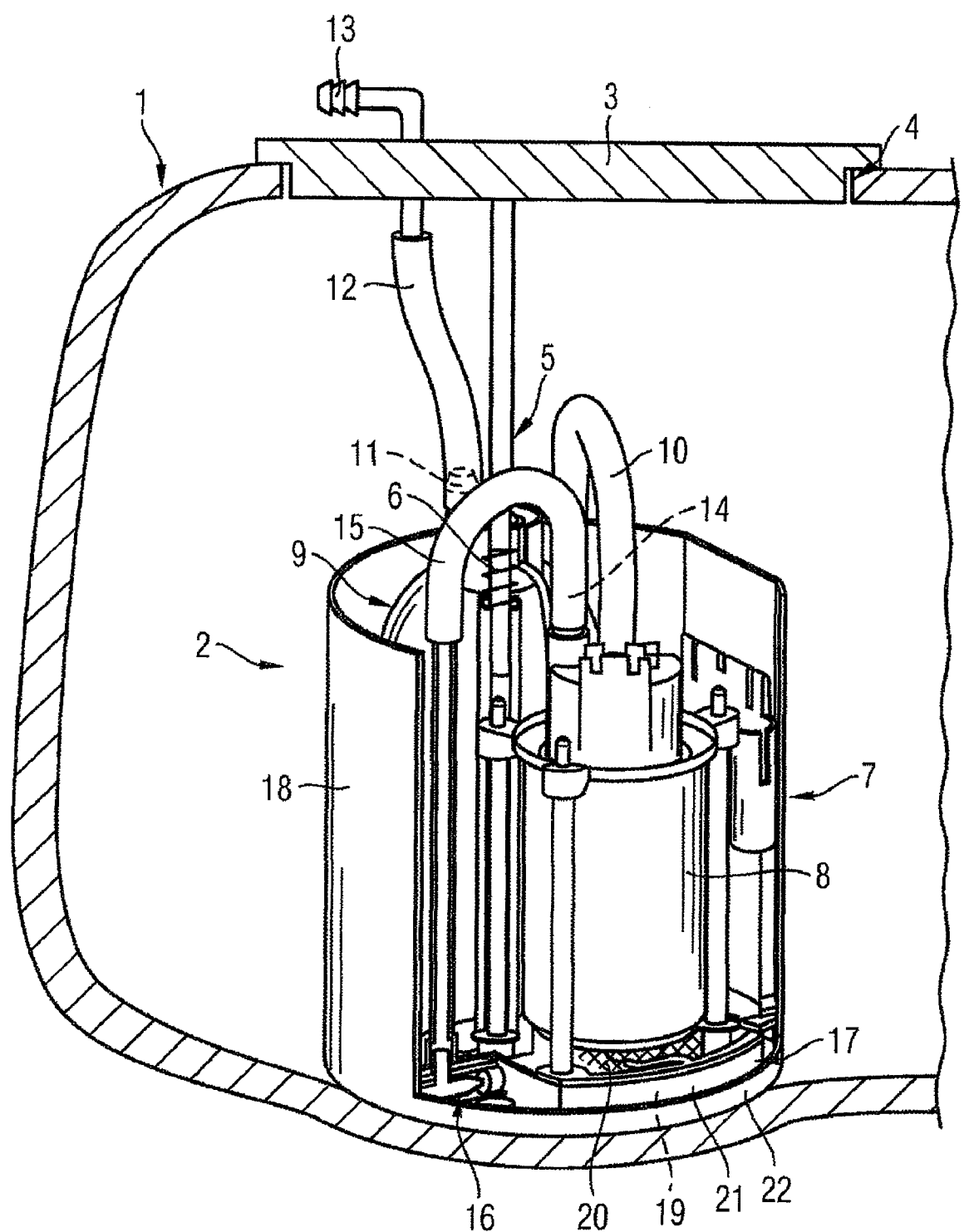
FIG. 1 is, in partial section, a feed unit according to one embodiment of the invention with adjacent components of a fuel tank.

FIG. 1 shows a feed unit 2 which is arranged in a fuel tank 1 of a motor vehicle and is intended for feeding fuel to an internal combustion engine (not illustrated) of the motor vehicle. The fuel tank 1 has an installation opening 4 which is closed by a flange 3 of the feed unit 2. The feed unit 2 has a telescopic guide 5 with a spring element 6 for prestressing a swirl pot 7 against the base of the fuel tank 1. The feed unit 2 has a fuel pump 8 arranged in the swirl pot 7 and driven by an electric motor, and a fine filter 9. The fine filter 9 is likewise arranged in the swirl pot 7 and is connected to the fuel pump 8 via a fuel line 10. Furthermore, the fine filter 9 has a connecting piece 11 for a feed line 12 leading to the internal combustion engine of the fuel tank 1. To simplify the drawing, of the feed line 12 only a subsection leading to a connecting piece of the flange 3 is illustrated.

A line 15 for a suction jet pump 16 is connected to a connection 14 of the fuel pump 8. The suction jet pump 16 sucks up fuel from the surroundings of the swirl pot 7 and feeds said fuel into the swirl pot 7. The swirl pot 7 serves to collect the fuel and has a base plate 17 and a casing 18 connected in a sealing manner to the base plate 17. A suction connection piece 19 of the fuel pump 8 projects through a preliminary filter 20 into a collecting chamber arranged between the base plate 17 and the preliminary filter 20. Fuel flowing into the swirl pot 7 passes via the preliminary filter 20 into the collecting chamber and therefore to the suction connecting piece 19 of the fuel pump 8. The fuel pump 8 is therefore capable of sucking up prefiltered fuel from the swirl pot 7 and of feeding said fuel via the fine filter 9 to the connecting piece 13 of the feed line 12. The casing 18 of the swirl pot 7 has an edge 22 gripping over a supporting edge 21 of the base plate 17. The edge 22 and the supporting edge 21 are connected to each other in a sealing manner.

Figure 2:
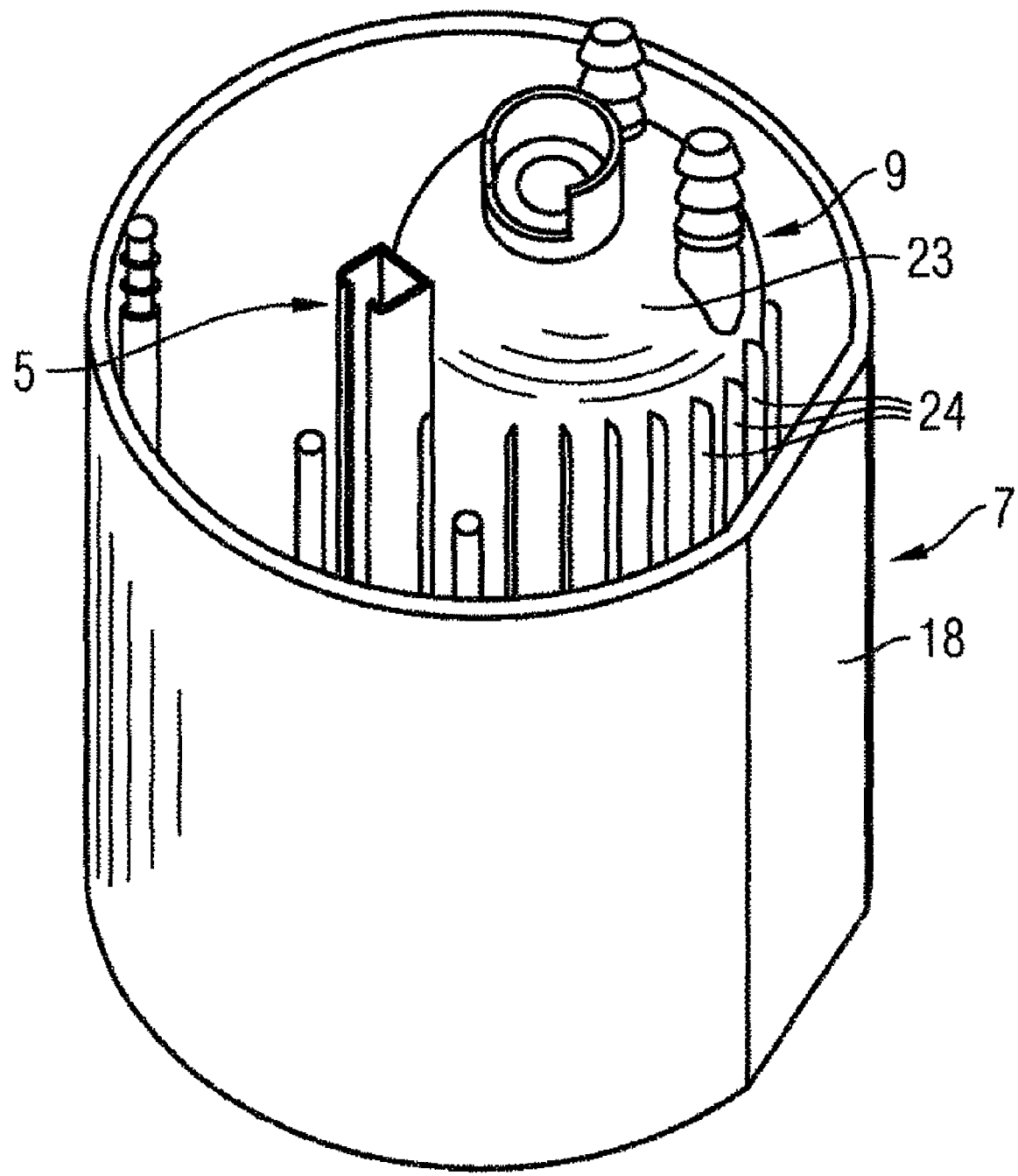
FIG. 2 is, perspectively, a swirl pot of the feed unit of FIG. 1 with a fine filter.

FIG. 2 shows, in a perspective illustration of the swirl pot 7, that a housing 23 of the fine filter 9 is manufactured integrally with the casing 18 of the swirl pot 7. On the outside of the housing 23 of the fine filter 9, reinforcing webs 24 are arranged parallel to the casing 18 of the swirl pot 7. Furthermore, the housing 23 of the fine filter 9 is manufactured integrally with a lower part of the telescopic guide 5. The lower part of the telescopic guide 5 and the reinforcing webs 24 together with the curved shape of the housing 23 produce the envisaged stability of the housing 23.

Figure 3:
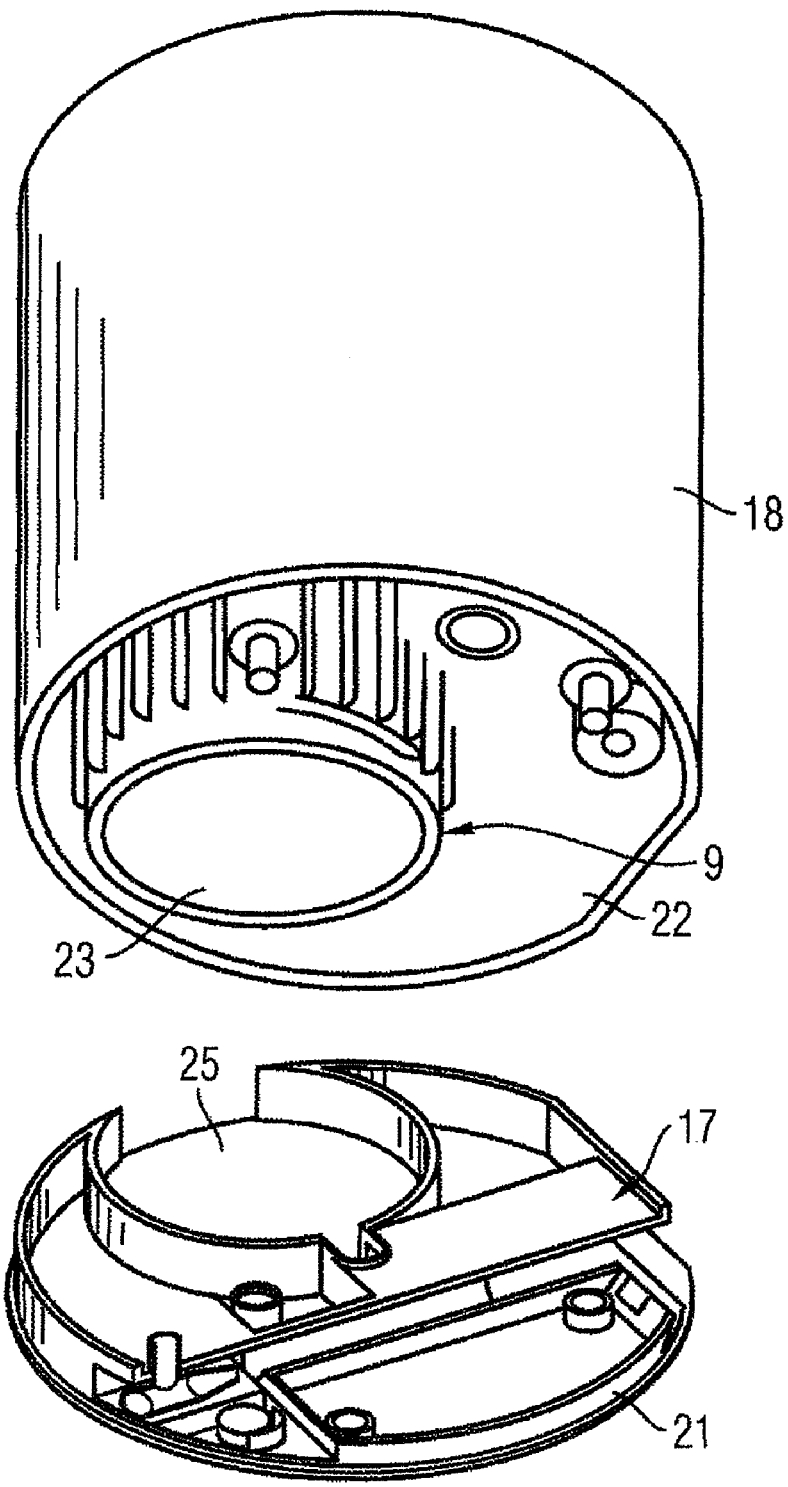
FIG. 3 is, perspectively, the swirl pot from FIG. 1 with the fine filter from below in the opened state.

FIG. 3 shows the swirl pot 7 with the housing 23 of the fine filter 9 from below with the base plate 17 removed from the casing 18 of the swirl pot 7. It can be seen here that the housing 23 of the fine filter 9 is configured such that it is open downward and can be closed by a cover connected to the housing 18 in the sealing manner. The cover 25 is manufactured integrally with the base plate 17. With the sealing connection of the base plate 17 to the casing 18 of the swirl pot 7, the housing 23 of the fine filter 9 is therefore closed downward. Furthermore, FIGS. 2 and 3 show that, apart from the base plate 17 and the cover 25, all of the components of the swirl pot 7 and of the housing 23 of the fine filter 9 can be manufactured in an injection mold from which a product can be removed axially.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A feed unit for feeding fuel out of a fuel tank of a motor vehicle, comprising:
 a swirl pot for collecting the fuel comprising:
  a casing for the swirl pot; and
  a base for the swirl pot;
 a fuel pump configured to draw up fuel from the swirl pot;
 a fine filter after the fuel pump in the direction of flow configured to filter the fuel; and
 a fine filter housing configured to house the fine filter having a curved end;
 wherein the fine filter housing is manufactured integrally with the casing of the swirl pot, and the base of the swirl pot is configured as a cover to seal an end of the fine filter housing opposite the curved end.

2. The feed unit as claimed in claim 1, wherein the fine filter housing is sealed on a first end by a cover.

3. The feed unit according to claim 2, wherein the cover is manufactured integrally with a base plate of the swirl pot.

4. The feed unit according to claim 2, wherein the fine filter housing curved end faces away from the cover.

5. The feed unit according to claim 1, wherein an outer surface of the fine filter housing has a plurality of reinforcing webs.

6. The feed unit according to claim 5, wherein the plural reinforcing webs have the same wall thickness as the housing of the fine filter.

7. The feed unit according to claim 5, wherein the plural reinforcing webs of the fine filter housing are configured to be parallel to a wall of the swirl pot.

8. The feed unit according to claim 1, further comprising a telescopic guide configured to for support the swirl pot in the fuel tank, wherein the telescopic guide is coupled to the housing of the fine filter.

9. The feed unit according to claim 1, wherein the fine filter housing is in the swirl pot.

10. The feed unit according to claim 3, wherein the cover and the base plate are injection molded.

11. The feed unit according to claim 9, wherein the fine filter housing and the swirl pot casing are injection molded.

12. The feed unit according to claim 9, wherein the telescopic guide is injection molded as a portion of the fine filter housing.

* * * * *